United States Patent [19]

Rubin

[11] Patent Number: 5,175,551
[45] Date of Patent: Dec. 29, 1992

[54] DOWNDRAFT VELOCITY ESTIMATOR FOR A MICROBURST PRECURSOR DETECTION SYSTEM

[75] Inventor: William L. Rubin, Whitestone, N.Y.

[73] Assignee: Unisys Corporation, Blue Bell, Pa.

[21] Appl. No.: 809,600

[22] Filed: Dec. 18, 1991

[51] Int. Cl.$^5$ .......................................... G01S 13/95
[52] U.S. Cl. ................................................ 342/26
[58] Field of Search ........................................ 342/26

[56] References Cited

U.S. PATENT DOCUMENTS

| | | | |
|---|---|---|---|
| Re. 33,152 | 1/1990 | Atlas | 342/26 |
| 4,965,573 | 10/1990 | Gallagher et al. | 342/26 X |
| 5,077,558 | 12/1991 | Kuntman | 342/26 |
| 5,093,662 | 3/1992 | Weber | 342/26 |

Primary Examiner—T. H. Tubbesing
Attorney, Agent, or Firm—Seymour Levine; Albert B. Cooper; Mark T. Starr

[57] ABSTRACT

A weather surveillance apparatus utilizes a set of beams in an elevation angular sector, one beam being offset from the other by a predetermined offset angle. Radar signal returns in each beam are processed to establish an average doppler frequency shift for the signals in the respective beams. An average of the averages and a difference of the averages are determined which are utilized to establish horizontal and vertical wind velocities. These velocities are further processed to determine whether a microburst precursor exists and the location, magnitude, time to impact, and track of any resulting windshear.

11 Claims, 6 Drawing Sheets

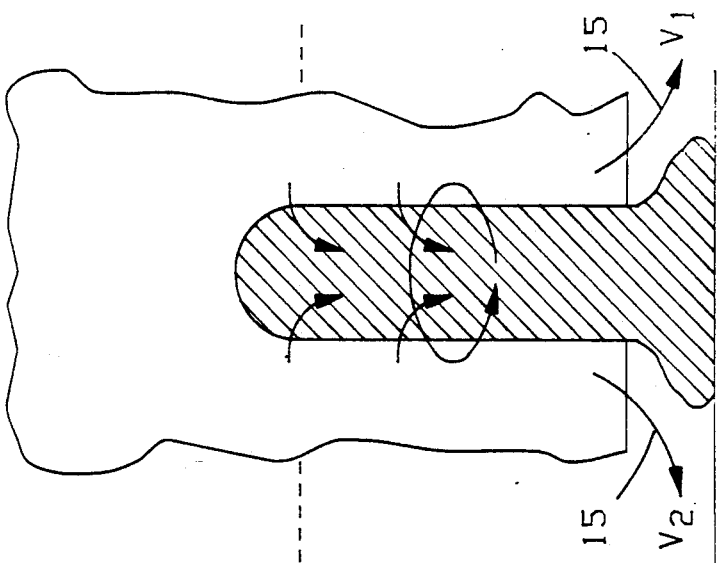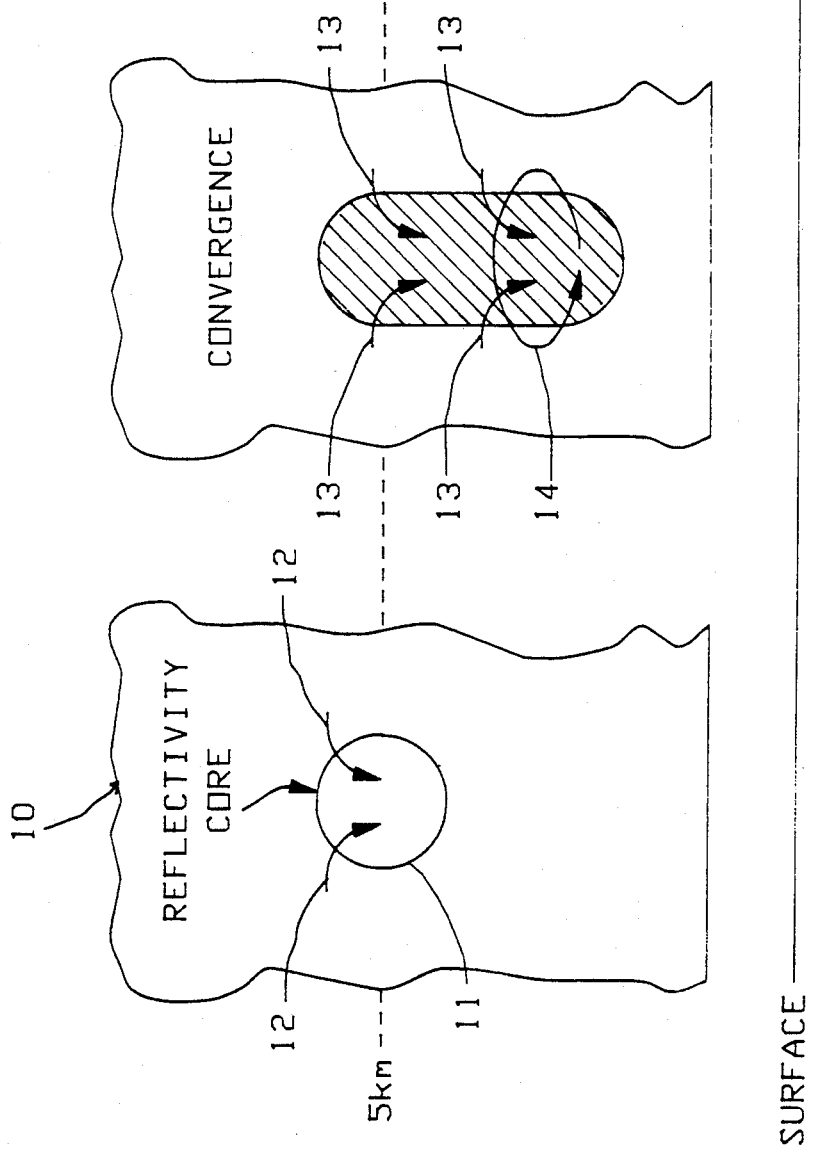

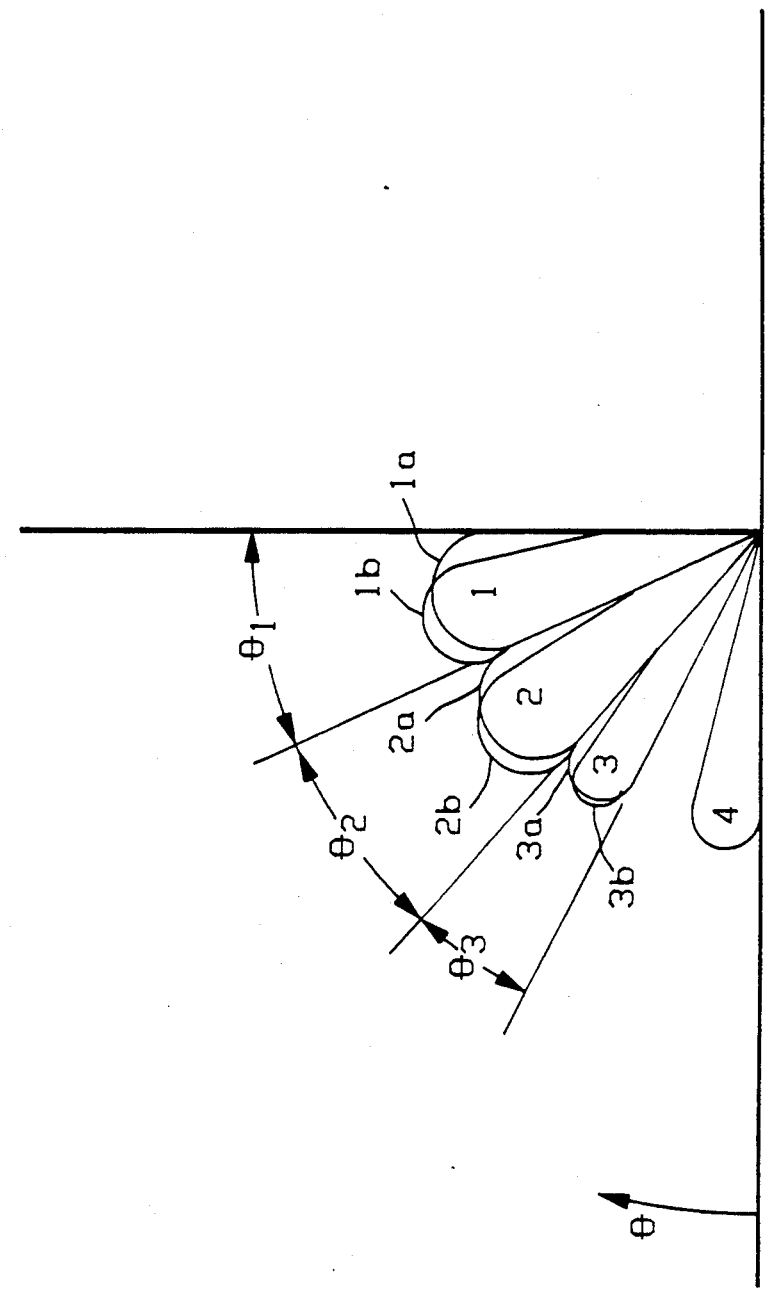

DOWNDRAFT VELOCITY ESTIMATOR FOR A MICROBURST PRECURSOR DETECTION SYSTEM

BACKGROUND OF THE INVENTION

1. Field of the Invention

The present invention relates generally to the prediction of weather disturbances and, more particularly, to the prediction of weather disturbances that give rise to microburst wind shear conditions at low altitudes over the earth's surface which are hazardous to aircraft during takeoff and landing.

2. Description of the Prior Art

A microburst is a powerful downward blast of air, usually associated with a thunderstorm or rain, followed by wind shear, a violent horizontal burst of air in all directions at low altitudes. Wind shear, which is extremely hazardous during aircraft takeoffs and landings, occurs over a relatively small region and typically lasts 5 to 15 minutes.

A system for providing an early warning of wind shear conditions is disclosed by W. L. Rubin et al in U.S. patent application Ser. No. 07/683,356 entitled "Microburst Precursor Detection Utilizing Microwave Radar" and is assigned to the assignee of the present invention. In accordance with this prior art, early warning of wind shear conditions is provided by detecting the vertical wind downdraft during its descent before it reaches ground level and establishes the conditions that generate wind shear. Vertical wind downdraft is determined by extracting four weather parameters from received signals of a scanning single beam or vertically stacked multiple beam microwave doppler radar system which illuminates a preselected altitude range for a predetermined distance about an airport. The number of beams of the doppler radar system and their beamwidths are designed to provide coverage over the preselected altitude range in a manner that establishes a vertical and horizontal limit for each range cell of the doppler radar system for all slant ranges that are less than a predetermined distance. The horizontal limit is selected to insure that a vertical wind downdraft column completely fills the beam, while the vertical limit is selected to restrict the effects of wind velocity gradients within a range cell. The received radar signals are processed to establish mean radial velocity, spectral width and skewness of the precipitation doppler velocity spectrum, and precipitation reflectivity in each range-azimuth cell in an illuminated azimuth-elevation sector. This data is then utilized to establish hydrometeor (precipitation) vertical velocity, horizontal wind velocity, and spatial location and extent of these parameters. The vertical wind velocity, spatial extent, and reflectivity are then compared to meteorological characteristics of storm generated microburst precursors: a vertical wind downdraft velocity of at least five meters per second, a vertical wind downdraft column between 1.5 and 3.0 kilometers in diameters, and an increase in precipitation reflectivity of 0–20 dB over that of the surrounding regions within the vertical wind downdraft. All of these criteria are utilized to confirm that a microburst generating downdraft has been initiated.

The doppler velocity spectrum within an elevated antenna beam is established by combining the radial component of vertical rain drop velocity, which is a function of the sine of the beam elevation angle, with the radial component of horizontal rain drop velocity, which is a function of the cosine of the beam elevation angle, over the beamwidth of each elevated beam. This velocity spectrum is unique for each combination of average vertical and horizontal hydrometeor velocities within each range azimuth cell. The measured doppler spectrum parameters in each range-azimuth cell in each beam within the illuminated altitude region are stored on successive radar scans to establish a four dimensional map. Measured doppler spectral parameters include mean doppler velocity, doppler spectrum width, doppler spectrum asymmetry, and total doppler spectral power in the radar echo. These measured parameters of hydrometeors immersed in a microburst downdraft provide the basic information from which microburst precursor vertical and horizontal wind velocity can be estimated. When it is determined from these maps that a vertical wind column of between 1.5 and 3.0 kilometers diameter, having a vertical wind velocity which exceeds five meters per seconds and exhibits a precipitation reflectivity that is 0–20 dB above the surrounding areas has been detected, a microburst warning is generated. Since time for the vertical downdraft to descend to the earth's surface from the maps data area is in the order of five minutes, this warning will precede the occurrence of subsequent surface microburst wind shear by a time that is adequate to divert or to delay an aircraft takeoff or landing.

The aforementioned patent application includes a microburst downdraft verification mode, wherein a paired set of measurements of $(\beta, V_{RAD})$ in each range-azimuth cell, $V_{RAD}$ being the mean radial doppler velocity and $\beta$ the mean doppler spectral skewness, are processed to provide a paired estimate of $(V_V, V_H)$, $V_V$ being the mean vertical velocity, $V_H$ the mean horizontal velocity of raindrops in the range-azimuth cell, and a paired set of measurements $(\sigma, V_{RAD})$, $\sigma$ being the mean doppler spectral width, are processed to provide a complementary paired estimate $(V_V, V_H)$ in the range-azimuth cell.

Two difficulties exist in this prior art system. First, since the magnitude of the spectral skewness $\beta$ is small, an accurate estimate of this parameter requires a very large number of data samples (received radar pulses for processing). Second, to obtain the paired set $(V_V, V_H)$ from the paired set $(\sigma, V_{RAD})$ the system assumes that the raindrop turbulence is 1.0 meter per second. Actual raindrop turbulence deviating from this assumed value produce errors in the paired set $(V_V, V_H)$. Though meteorological data indicates that raindrop turbulence is generally in the order of 1.0 meter per second, it is desirable to eliminate the dependence upon this assumption and provide a more accurate paired set $(V_V, V_H)$ when the raindrop turbulence differs from this value.

SUMMARY OF THE INVENTION

In accordance with the present invention a preselected altitude range about an airport is scanned by one or more antenna beam combinations. Each combination contains two beams, the peaks of which are offset by a preselected elevation angle. One beam of the two beam combination, hereinafter referred to as the second beam, possesses a narrower elevation beam width than the first beam in the combination. During the down draft verification and track mode, microwave energy is transmitted via the first beam and radar returns received via both beams. The received signals are processed to obtain the reflectivity of the rain and to provide the average of the radial velocities detected in each beam. The two averages are then further processed to establish the difference therebetween and the average value of the two radial velocity averages. These values, the difference between the average radial velocity in each beam and the average of these two averages, are then utilized with predetermined functions of radial velocity difference versus the average of the averages of radial velocity for preselected values of horizontal wind and vertical rain velocities, to establish the horizontal wind and vertical rain velocities. Vertical rain velocity in still air is obtained with the utilization of the reflectivity in the Joss-Waldvogel relationship and subtracted from the established vertical rain velocity to derive the vertical wind velocity. The horizontal and vertical wind velocities are then further processed, as in the prior art discussed above, which is incorporated herein by reference, to determine whether a microburst precursor has been detected. This processing requires fewer data samples than that required by the prior art by a factor of approximately 100 to obtain an accurate estimate of the paired set ($V_V$, $V_H$). Further, the invention is substantially independent of raindrop turbulence.

The invention will be more fully explained in the following detailed description with references to the drawings herein provided.

BRIEF DESCRIPTION OF THE DRAWINGS

FIGS. 2a, 2b, and 2c illustrate precursors of a microburst.

FIG. 3 is an illustration of vertically stacked antenna beam combinations that may be employed to obtain microburst prediction data.

DESCRIPTION OF THE PREFERRED EMBODIMENTS

A major cause of aircraft landing/take-off accidents is a particular form of wind shear, referred to as a microburst. The term microburst, coined to connote an aviation hazard, is a powerful downward blast of moist air which causes a violent horizontal burst of air in all directions near ground level. This violent horizontal burst creates a horizontal wind velocity differential across its center. A microburst is said to have occurred when this wind shear is greater than or equal to 10 meters per second across a surface region approximately 4 Km in diameter below 500 meters above ground level (AGL). At low altitudes ground radar detection of wind shear is limited by ground returns known as clutter and by the fact that in many cases much of the (radar echo producing) moisture in the downdraft evaporates before it reaches the ground. Typical clutter levels and airport surveillance radar antenna rotation rates at urban airports limit wind shear detection to microbursts having precipitation reflectivities in the order of 10-20 dBz or greater. If clutter were not present, or attenuated when feasible through signal processing means, noise limitations determine detectable signal levels and an order of magnitude increase in sensitivity would be realized. The degree that clutter can be attenuated through signal filtering is dependent on antenna rotation rates and azimuth beamwidth. More rapid antenna rotation or narrower antenna beamwidths produce higher levels of modulation of ground clutter making it more difficult to reduce clutter through input signal filtering. Two types of microbursts are known: dry and wet. Dry microbursts generally occur in dry climates whereat heavy rain aloft, which initiates the events that cause severe ground wind shear conditions, mostly evaporates before reaching the ground. Dry microburst wind shear, due to the low level of entrained moisture at the ground level, exhibit reflectivities well below 20 dBz. Wet microburst wind shear generally occurs in regions of heavy rain and only partially evaporates before reaching the ground. Such microburst wind shear normally exhibit reflectivities well in excess of the 20 dBz level. Thus ground clutter inhibits the detection of dry microburst wind shear as well as wet microburst wind shear by radar systems operating with near ground level radar beams.

Figure 1:
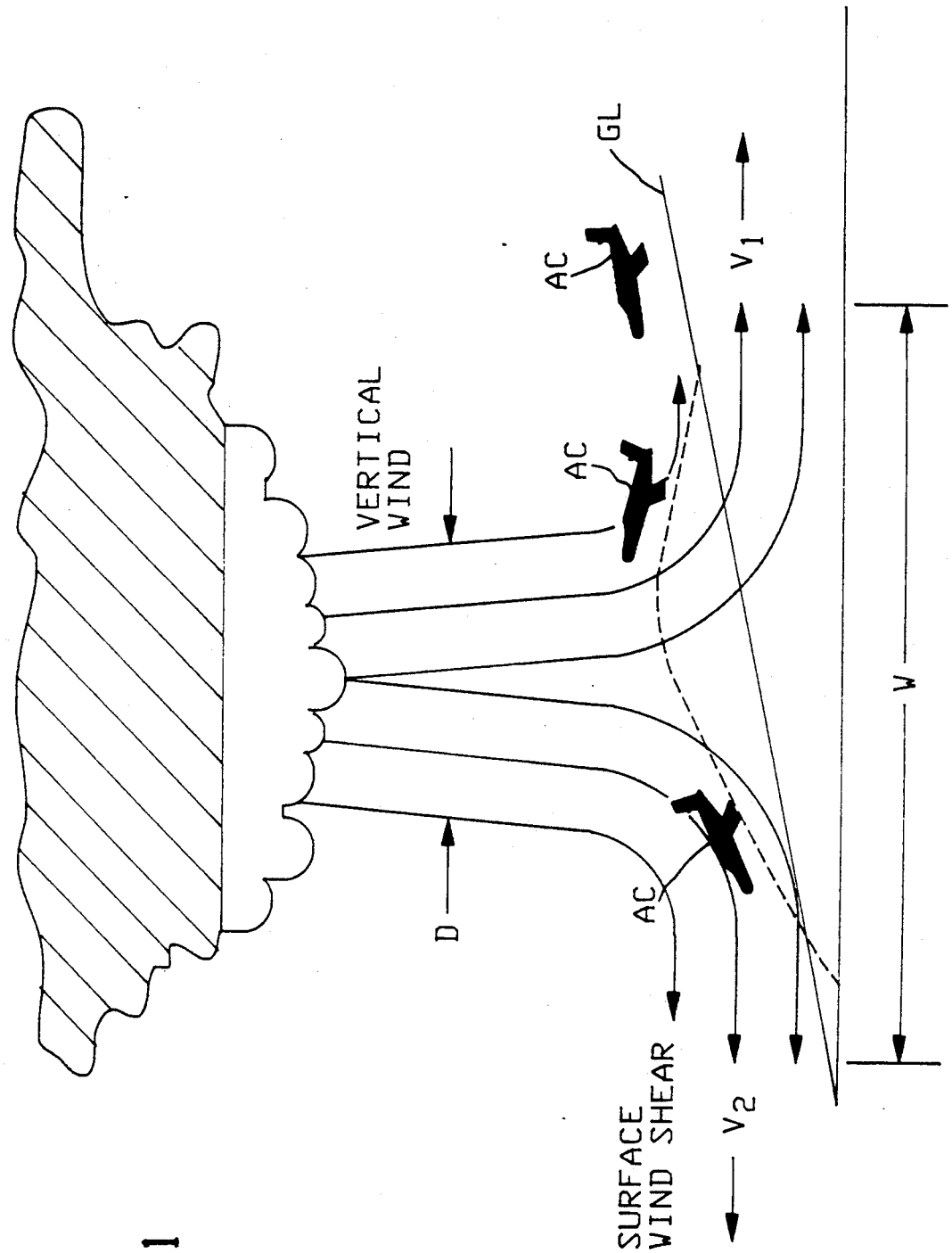
FIG. 1 is a diagram which is useful for explaining weather conditions that give rise to a microburst and the establishment of wind shear conditions.

Refer now to FIG. 1. A microburst is caused by a strong vertical downdraft, having a horizontal diameter D that is between 1.5 and 3 kilometers, which originates at high altitudes. The disturbance diameter increases as the downdraft approaches the earth's surface and establishes a horizontal wind velocity differential $V = V2 - (-V1)$ near the surface, that is at least 10 meters per second (20 kts) and may be between 60 kts and 100 kts, over a distance W of at most 4 Km. (When W is greater than 4 Km, a macroburst is said to have occurred, a condition which is less dangerous for aircraft landing or taking off.) Although a downdraft is one of several meteorologically detectable phenomena, which are collectively referred to as microburst precursors, the downdraft is the least unambiguous precursor of follow-on surface microburst wind shear.

Landing aircraft AC entering a microburst wind shear region first experiences an increase in head wind which causes the aircraft AC to fly above the glide slope GL. The pilot may attempt to return to the glide slope GL by reducing air speed and angle of attack. As the aircraft AC continues through the microburst, it encounters a strong downdraft which forces it downward while it moves horizontally and then a tail wind resulting in a loss of lift. As the aircraft AC falls beneath the glide slope GL, the pilot must now increase power and angle of attack to bring the aircraft AC back to the glide slope GL. Since the aircraft requires a finite time to respond to the control commands, a crash may occur when it is too close to the ground to recover.

Microburst precursors occur between 1 and 8 Km above ground level (AGL) about 5-15 minutes prior to the onset of low altitude wind shear. Diagrams depicting the formation of a typical wet microburst are shown in FIGS. 2a, 2b, and 2c. In the first stage 10 a core 11 of densely packed water, with a concomitant high reflectivity, is formed at an altitude of between 3 and 8 Km AGL. Coinciding with the formation of the core 11 is an inflow of air 12 at or above the core 11. When instability causes the high reflectivity core 11 to descend, it causes an additional convergence of air 13 behind its descent and, in many cases, air rotation 14 of the descending column. The falling high reflectivity core 11 also pushes moisture laden air below it downward, resulting in a strong downdraft which accelerates as air cooling takes place due to moisture evaporation. This high reflectivity core may reach the surface coincident with or after wind shear has been initiated. The strong downdraft establishes an air divergence 15 at the surface, giving rise to the wind velocity differential V.

Thus weather phenomena aloft provide detectable precursors from which microbursts at the surface may be predicted with sufficient lead time to prevent an aircraft disaster during landing or takeoff. Precursors associated with the descending downdraft include: a descending reflectivity core, horizontal wind convergence aloft, and horizontal rotation of the downdraft column. These precursors are indirect signatures of the vertical wind downdraft, which is the direct cause of surface microburst wind shear. Since a descending high reflectivity core together with wind convergence and rotation are only indirect signatures of the vertical wind downdraft, they are less reliable than direct measurement of the vertical wind velocity as indicators of an impending microburst. Descending high reflectivity cores, coupled with substantial horizontal wind convergence and rotation, have been observed without the occurrence of subsequent microburst; and microbursts have also occurred in their absence. Consequently, unambiguous prediction of a microburst requires direct knowledge of a vertically descending downdraft having a reflectivity greater than 15 dBz that is typically at least equal to or greater than the surrounding region, and a vertical wind velocity greater than 5 meters per second within a column having an aloft diameter between 1.5 and 3.0 Km. As the moist downdraft descends, evaporation in the column causes cooling and induces an acceleration which can increase the vertical wind velocity up to 25 meters per second. The presence of all three factors establishes a definite precursor of an imminent microburst.

Consequently, an early warning system for the prediction of a surface microburst must be able to detect vertical downdrafts at altitudes 1-3 Km. This may be accomplished with a squinted set of antenna beams, each coupled to a doppler radar system, oriented for high elevation angle scanning or a multiplicity of stacked sets of such antenna beams, each set oriented to scan an assigned elevation sector, as shown in FIG. 3. In each beam set a first ($1a$, $2a$, $3a$), or primary beam, is utilized to transmit radar signals and to receive radar signal returns, while a second ($1b$, $2b$, $3b$), or added beam, having a beam peak offset by a preselected elevation angle from the beam peak of the first is utilized only to receive radar signal returns. The second beam in each set may have an elevation beamwidth that is 3° to 5° narrower than that of the primary beam. In a stacked beam system, the number of beam sets and the beam widths of the primary beams are selected to provide coverage over a desired altitude range above ground level (AGL) in a region around an airport. Once the elevation coverage and the number of beams to provide this coverage is selected, an elevation beam width for each primary beam is established which provides approximately the same percentage spread of vertical wind velocity as measured in each primary elevation beam.

The primary elevation beam width for each beam in the beam configuration shown in FIG. 3 would be selected in accordance with the following relationship:

$$\frac{\sin \Theta_1}{\sin \Theta_2} \approx \frac{\sin \Theta_2}{\sin \Theta_3} \approx \frac{\sin \Theta_3}{\sin \Theta_4}$$

where $\Theta_i$ are the successive elevation angles defining the primary beam elevation crossovers. Though only three beam sets are shown in FIG. 3, this is not restrictive and a greater or lesser number may be chosen to optimize coverage at a system location.

Figure 4:
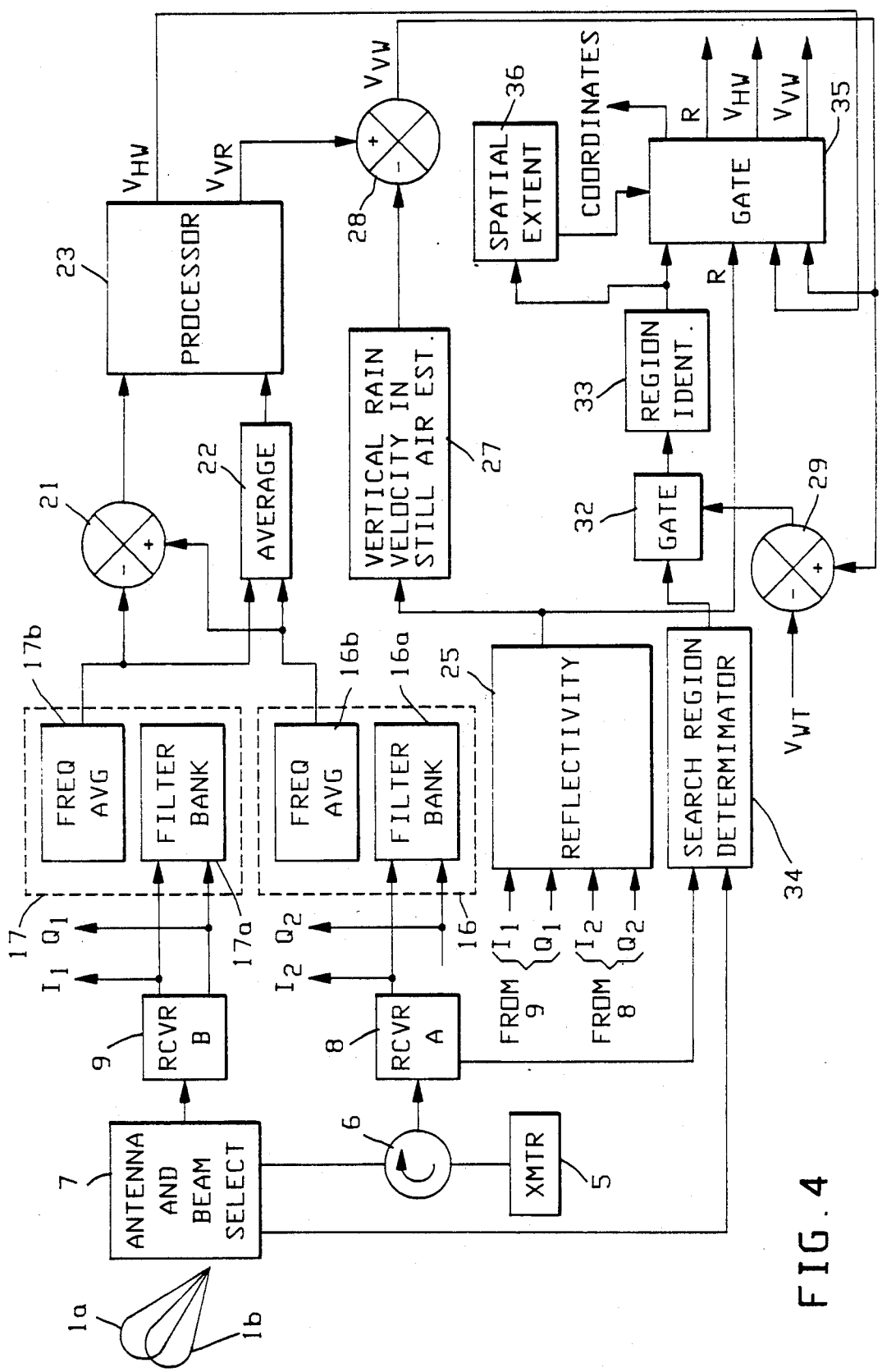
FIG. 4 is a block diagram of a preferred embodiment of the invention.

Refer now to FIG. 4 wherein a block diagram of a preferred embodiment of the invention for operation with a set of antenna beams is shown. A transmitter 5 generates a radar signal which is coupled through a circulator 6 to an antenna and beam selector 7 wherefrom it is radiated via the primary beam of the selected beam set, as for example beam a of beam set 1 (beam $1a$). Return signals are received on both beams a and b of the selected set and respectively coupled to coherent receivers 8 and 9. It should be recognized that the beam sets are rotationally selected to provide a continuous elevation sector coverage as the antenna is rotated azimuthally by an azimuth drive mechanism, not shown. The coherent receivers 8, 9 respectively provide two output signals, designated I and Q, to digital filter banks $16a$ and $17a$ in mean velocity estimators 16, 17.

Each filter in the filter banks $16a$, $17a$ processes the I and Q signals resulting from a predetermined number of received radar returns in manner well known in the art and provides a coded signal representative of the center frequency of the filter when a signal having a doppler frequency corresponding to the center frequency of the filter is detected. These coded signals are coupled to averaging processors $16b$, $17b$, respectively, wherein the average doppler frequency of the radar returns in beams $1a$ and $1b$ are computed. Signals representative of these two average are coupled to a differencing processor 21 and to an averaging processor 22 which respectively provide the difference between the average doppler velocity and the average of the average doppler velocity in beams $1a$ and $1b$. Since the elevation angle difference between the two beams is small, the horizontal and vertical velocities which combine to establish the detected radial velocities are equal in beams $1a$ and $1b$. Those skilled in the art can readily verify that the difference $\Delta$ between the average radial velocities and the average $\Sigma$ of the average radial velocities may be represented as:

$$\Delta = \delta[V_{VR} \cos(\Theta - \delta/2) - V_{HW} \sin(\Theta - \delta/2)] \quad (1)$$

$$\Sigma = V_{VR} \sin(\Theta - \delta/2) + V_{HW} \cos(\Theta - \delta/2) \quad (2)$$

where $\Theta$ is the elevation angle of the first beam $1a$ peak, $\delta$ is the offset elevation angle of the second beam $1b$ peak from the first beam $1a$ peak, $V_{VR}$ is the vertical rain velocity, and $V_{HW}$ is the horizontal wind velocity. Since $\Theta$ and $\delta$ are known, these equations may be solved to uniquely obtain the values of $V_{VR}$ and $V_{HW}$.

Figure 5:
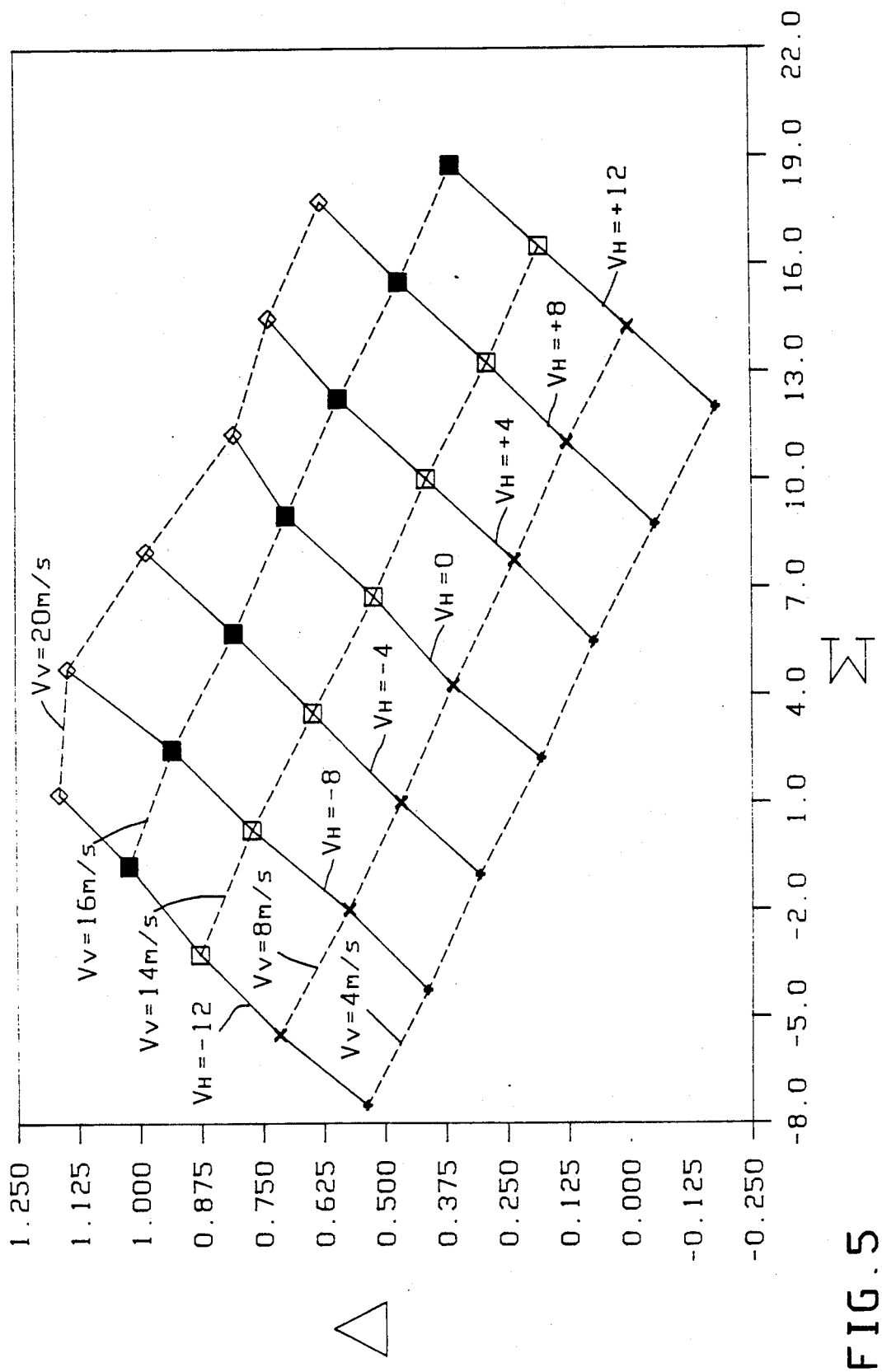
FIG. 5 is a carpet plot of the difference of the average radial doppler velocity in each beam versus the average of the average doppler velocity in each beam for various values of horizontal and vertical wind velocities.

A carpet plot graphically illustrating solutions of the above equations when $\Theta$ equals 40° and $\delta$ equals 3° is shown in FIG. 5. The solid curves on the graph represent constant horizontal wind velocity and the dotted curves represent constant vertical rain velocity. Each set of $\Delta$, $\Sigma$ values provides a corresponding unique set of $V_{VR}$, $V_{HW}$ values.

Each set of $\Delta$, $\Sigma$ values computed by the differencing 21 and averaging 22 processors is coupled to a processor 23 which simultaneously solves equations (1) and (2)

for the vertical rain velocity and the horizontal wind velocity. This processor may be a memory having memory cells addressed by the $\Delta, \Sigma$ value set, each memory cell containing the solution for the addressing values. The processor 23 may also be a computer programmed to simultaneously solve equations (1) and (2) directly.

The I and Q values from receivers 8, 9 are also coupled to a reflectivity processor 25 wherein the mean power received by each beam is determined in a manner similar to the manner described in the aforementioned patent application. These mean powers are averaged and the average utilized to establish the reflectivity of the rain as the described in the referenced patent application. The reflectivity so determined is coupled to vertical rain velocity in still air estimator 27 wherein the Joss-Waldvogel relationship is utilized to obtain an estimate of the vertical rain velocity in still air. This estimate is coupled to a differencing network 28, wherein it is substracted from the vertical rain velocity $V_{VR}$, coupled to the differencing network from the processor 23 to obtain the vertical wind velocity $V_{VW}$.

This vertical wind velocity is compared to a threshold downdraft velocity $V_{wt}$, which is representative of a minimum downdraft velocity of a microburst, in a comparator 29 wherefrom a signal is coupled to enable a gate 32 through which the address of the range bins in which the downdraft velocity exceeds the threshold is passed to a precursor region identifier 33. These addresses are provided by search region determinator 34 which processes antenna position and range gate location signals respectively received from the beam selector 7 and receiver 8.

The range bin addresses are stored in the region identifier 33 wherefrom they are coupled to gate 35 and to a spatial extent tester 36, wherein the spatial extent of the downdraft velocity exceeding the threshold is determined and compared to a stored spatial extent of a microburst. Should the comparison determine that the spatial extent of the downdraft velocity exceeding the threshold is comparable to that of a microburst, gate 35 is activated and the values of vertical and horizontal wind velocity, reflectivity, and location are provided at the output terminals of the gate 35.

Figure 6:
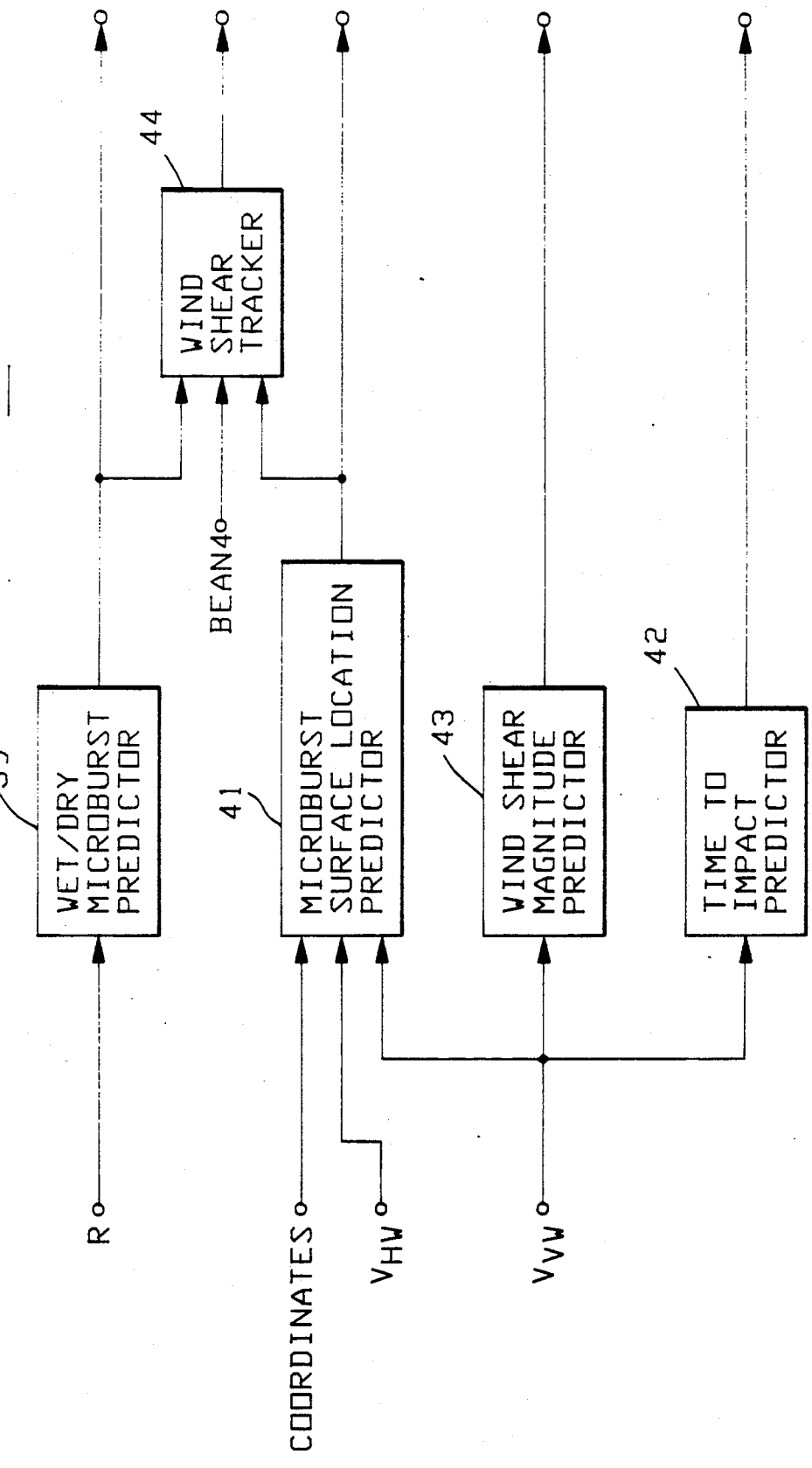
FIG. 6 is a block diagram of a wind shear predictor that may be utilized to process the parameters provided by the preferred embodiment of the invention of FIG. 4 for the prediction of a wind shear condition.

The horizontal and vertical wind velocities, reflectivity, and location coordinates coupled through gate 35 are provided to the wind shear predictor 37, a block diagram of which is shown in FIG. 6. The reflectivity R provided by processor 25 is coupled through the gate 35 to a microburst predictor 39 wherein a prediction of a wet or dry microburst, based upon the magnitude of the reflectivity, is made. A dry microburst is predicted should R be between 15-25 dBz and a wet microburst is predicted should R be above 25 dBz.

Horizontal wind velocity provided by the processor 23, the vertical wind velocity provided by the differencing network 28, and the coordinates of the region in which the downdraft exceeds the threshold are coupled to a microburst surface location predictor 41 which utilizes this data in a conventional manner to predict the surface location of the microburst impact. The vertical wind velocity is also coupled to a time to impact predictor 42 which, in a conventional manner, predicts the time that the microburst will impact the surface and to a wind shear magnitude predictor 43.

Wet/dry microburst predictor 39 and surface location predictor 41 each couple data to a wind shear tracker 44 which also receives radar data from a radar receiver (not shown) that is coupled to a doppler radar beam which provides coverage near ground level, beam 4 in FIG. 3. The wet/dry microburst data, the predicted microburst impact location, and the data provided by the receiver coupled to beam 4 are utilized to track the wind shear along the surface and provide predictions of subsequent wind shear locations.

Dry microburst surface wind shear contains a very small amount of moisture, since most of the original moisture content aloft evaporates before the downdraft reaches the surface. As a result it is very difficult to detect a dry microburst wind shear during its earliest occurrence at ground level because of ground clutter, without the predicted microburst downdraft impact location and wind shear magnitude. Using information from the wet/dry microburst predictor, the time-to-impact predictor, and the microburst surface location predictor, the receiver coupled to beam 4 searches the range-azimuth bins covering the predicted surface impact area on each scan to pick up the first indications of wind shear resulting from the downdraft reaching the ground. After initial detection of the wind shear, beam 4 derived information provides up-to-date information with respect to the location and magnitude of microburst wind shear. This information is provided until the wind shear magnitude attenuates to the point at which it is no longer a treat.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A weather surveillance apparatus comprising:
   antenna means for providing at least one set of radar beams for weather surveillance of an elevation angular sector, said one set having a first beam with a peak at a predetermined elevation angle to provide radar surveillance in a predetermined elevation angular region within said elevation angular sector and a second beam with a peak offset from said predetermined elevation angle by a preselected offset elevation angle to provide radar surveillance in a preselected elevation angular region within said elevation angular sector;
   means coupled to said antenna means for providing radar signals;
   means coupled to said antenna means for utilizing radar signal returns in said first and second beams to establish vertical wind velocity and horizontal wind velocity in said elevation angular sector.

2. A weather surveillance apparatus in accordance with claim 1 wherein said apparatus includes:
   first and second receiver means respectively coupled to said antenna means for providing signals representative of doppler shifted radar signal returns in said first and second beams;
   means responsive to said doppler shifted radar signal returns for providing a signal representative of average doppler frequency of signals in said first beam and for providing a signal representative of average doppler frequency of signals in said second beam; and
   processing means responsive to said signal representative of average doppler frequency of signals in said first beam and said signal representative of average doppler frequency of signals in said second beam for determining said vertical wind velocity and said horizontal wind velocity.

3. A weather surveillance radar in accordance with claim 2 wherein said processing means includes:

difference means responsive to said signals representative of average doppler frequencies of said first and second beams for providing a signal representative of a difference between said average doppler frequency of said first beam and said average doppler frequency of said second beam;

average means responsive to said signals representative of average doppler frequencies of said first and second beams for providing a signal representative of an average of said average doppler frequency of said first beam and said average doppler frequency of said second beam; and average and difference processing means coupled to receive said difference and average representative signals for providing a signal representative of horizontal wind velocity and a signal representative of vertical rain velocity.

4. A weather surveillance radar in accordance with claim 3 wherein said average and difference processing means comprises means for processing said difference and average representative signals to solve equations $$\Delta = \delta[V_{VR}COS(\Theta - \delta/2) - V_{HW}SIN(\Theta - \delta/2)] \quad (1)$$

$$\Sigma = V_{VR}SIN(\Theta - \delta/2) + V_{HW}COS(\Theta - \delta/2) \quad (2)$$

for vertical rain velocity $V_{VR}$ and horizontal wind velocity $V_{HW}$ where $\Delta$ is said difference representative signal, $\Sigma$ is said average representative signal, $\Theta$ is a representative signal of said elevation angle of peak of said first beam, and $\delta$ is a representative signal of said elevation offset angle of said second beam from said first beam.

5. A weather surveillance radar in accordance with claim 3 further including:

means coupled to said first and second receiver means for providing a signal representative of vertical rain velocity in still air; and means responsive to said signal representative of vertical rain velocity and said signal representative of vertical rain velocity in still air for providing a signal representative of vertical wind velocity.

6. A weather surveillance system in accordance with claim 5 wherein said vertical wind velocity means is a difference circuit which provides a signal representative of a difference between said signal representative of vertical rain velocity and said signal representative of vertical rain velocity in still air.

7. A weather surveillance radar in accordance with claim 5 wherein said vertical rain velocity in still air means includes:

means coupled to said first and second receiver means for providing a signal representative of reflectivity of rain passing through said first and second beams; and means responsive to said reflectivity representative signal for providing a signal representative of vertical rain velocity in still air.

8. A weather surveillance radar in accordance with claim 7 wherein said vertical rain velocity in still air means comprises means for processing said reflectivity representative signal in a Joss-Waldvogel relationship manner to provide said signal representative of vertical rain velocity in still air.

9. A weather surveillance radar in accordance with claim 5 further including:

means coupled to said first receiver means and said antenna means for providing signals representative of regions for which said vertical and horizontal wind velocity representative signals are determined;

comparator means coupled to receive a preselected threshold signal and said vertical wind velocity representative signal for providing an enable signal when said vertical wind velocity exceeds said preselected threshold; and gate means coupled to said comparator means and coupled to receive said regions representative signals, said vertical wind velocity representative signals, said horizontal wind velocity representative signals, and said reflectivity representative signals for providing signals representative of coordinates of said regions, said vertical and horizontal wind velocity representative signals, and said reflectivity representative signals when enabled by said enabling signal.

10. A weather surveillance radar in accordance with claim 9 wherein said gate means includes:

first gate means coupled to provide said regions representative signals when enabled by said enable signal;

region identifying means coupled to receive said regions representative signals via said first gate means for providing said signals representative of coordinates of said regions;

spatial extent means responsive to said coordinate representative signals for determining spatial extent of region wherein said vertical wind velocity exceeds said predetermined threshold and for providing a spatial enable signal when said spatial extent is within a range of predetermined dimensions; and second gate means coupled to provide said vertical and horizontal wind velocity representative signals, said reflectivity representative signals, and said coordinate representative signals when enabled by said spatial enable signal.

11. A weather surveillance radar in accordance with claim 9 further including:

means responsive to said reflectivity representative signal for providing a signal representative of a wet or dry microburst;

means responsive to said coordinate representative signals, said vertical wind representative signal, and said horizontal wind representative signal for providing a signal representative of a microburst surface location;

means responsive to said wet or dry microburst representative signal and said microburst surface representative signal for providing a wind shear track;

means responsive to said vertical wind velocity representative signal for providing a signal representative of wind shear magnitude; and means responsive to said vertical wind velocity for providing a signal representative of time of microburst surface impact.

* * * * *